Patented Sept. 18, 1934

1,973,910

UNITED STATES PATENT OFFICE 1,973,910

WETTABLE SULPHUR COMPOSITION

Paul D. Peterson, Ligonier, Pa., assignor to The Koppers Company of Delaware, a corporation of Delaware No Drawing. Application May 12, 1931, Serial No. 536,939

3 Claims. (Cl. 167—20)

This invention relates to an improved sulphur-containing composition adapted for use as a fungicide, and especially to a wettable sulphur composition adapted for use in the form of a dusting powder or in liquid sprays as a fungicide, insecticide and the like.

Sulphur in various forms and combinations has been widely used in fungicidal preparations and similar compositions for the control or destruction of fungi, insects, and other agricultural pests. Because of their efficiency and comparative cheapness, sulphur and sulphur compounds, such as lime-sulphur, are now recognized as standard materials for fungicidal control.

Sulphur and its compounds are usually applied in finely divided form as dusting powders, or by incorporating them in solution or suspension in an appropriate liquid, such as water, which is then sprayed onto the plants, trees, fruits, etc. The effectiveness of sulphur dust and sprays depends to a large extent on the fineness or extent of division of the individual sulphur particles, and when other conditions are similar increases as the particle size diminishes.

Because of their natural fineness, the by-product or flotation sulphurs recovered in sulphur-recovery processes or purifying gas from hydrogen sulphide, such as the processes known as the "Thylox" process, the "Nickel" process, and the "Ferrox" process, for example, have been found to be particularly well adapted to agricultural use. These sulphurs are recovered in a substantially colloidal degree of division, and may be used in wet or dry form as recovered, or preferably after treatment to remove soluble salts or other impurities, as described by M. Shoeld in a copending application Serial No. 358,426, filed April 26, 1929 (Case No. 201), for example. These sulphurs, or other sulphurs of similar fineness, are not only more active chemically but also form more stable suspensions than coarser sulphur.

For a variety of reasons, it is often desirable that the sulphur be capable of intimate contact with moisture, as well as that it be finely divided. It is known, however, that sulphur is not readily wetted by water, as it is a member of the class of substances having "greasy" or water-repellant surfaces. This characteristic of sulphur is especially disadvantageous when the sulphur is to be applied in wet form, as it makes it difficult to prepare homogeneous sulphur suspensions suitable for spraying.

To overcome this difficulty and to provide a wettable sulphur suitable for spraying and/or dusting, various processes and compositions have been developed in the past. Typical wettable sulphur compositions previously produced consist of mixtures of sulphur with a wetting agent, such as glue, saccharates, soap, proteins, albuminous matter, or mineral colloids such as bentonite. In many instances, wettability is obtained in these mixtures by forfeiting part of the fungicidal effectiveness of the sulphur, both because of dilution with the wetting agent, and because of the more or less impervious film formed on the surface of the individual sulphur particles.

Another disadvantage inherent in many of the wettable compositions known to the prior art is that while such compositions may be moderately satisfactory for use in paste or spray form, wettability is lost when the composition is dried to make a dusting powder or a lumpy and unsatisfactory powder is produced. Since many agriculturists prefer to employ a spray for treating certain of their plants and produce, and a dust for others, it is obviously desirable for them to be able to keep only one composition on hand, which is suitable for use either as dust or spray. Furthermore, considerable economies are effected by handling and shipping sulphur and its compounds in dry form instead of as a paste or liquid.

An object of my present invention is to provide an improved wettable sulphur composition, and a process of preparing such compositions.

A second object of my invention is to provide a wettable sulphur suitable for use in wet or dry form.

A further object of my invention is to provide a wettable sulphur composition having improved properties for use as a fungicide, insecticide, germicide, and the like.

My invention has for further objects such other advantages and results as are found to obtain in the process and product described and claimed herewith.

I have found that by adding certain wetting agents, which are preferably colloidal and preferably have an acid or neutral reaction, and suitable alkaline reagents, such as lime sulphur or analogous polysulphides or other soluble basic compounds, to finely divided sulphur, such as the by-product or flotation sulphur referred to hereinabove, an improved wettable sulphur composition is produced. I have found that this composition may be concentrated to dryness and transported and handled in the dry state, that it is satisfactory for use either as dust or in sprays, and that it is at least as effective and generally more effective than untreated sulphur and other wettable sulphurs.

I have found that a sulphur composition having particularly desirable properties is prepared by combining flotation sulphur or other finely divided sulphur with lime-sulphur (calcium polysulphide) and concentrated waste liquor produced in the sulphite process of pulp manufacture, or solids obtained from such waste liquor. This concentrated liquor, with or without previous partial or complete neutralization with lime or the like, and the solids obtained by evaporating such liquor to dryness, are known as "goulac", "glutrin", "lignin-pitch", and by various other names. They will be referred to hereinbelow as concentrated waste sulphite liquor and sulphite liquor solids.

Although I have found that these sulphite liquor products are particularly suitable for the purposes of my present invention, as stated hereinabove, the invention is not limited to the use of these compounds. I may substitute other suitable compounds which are preferably colloidal and preferably have an acid reaction (that is, a pH value preferably not exceeding 7), and which combine with lime-sulphur and the like in the presence of sulphur to form wetting agents having improved qualities, as described hereinbelow. Examples of such compounds are gum arabic, gum tragacanth, saccharoses, polysaccharides, and various extracts.

Furthermore, I have found that other materials having a basic reaction may be substituted for lime-sulphur in the preparation of my improved composition. For example, I may use potassium or sodium polysulphide; sodium sulphide or hydroxide; ammonium sulphide, hydrosulphide, or hydroxide; calcium hydroxide; potassium hydroxide, and analogous compounds. All of these materials are basic in reaction, as is lime-sulphur solution, and enough of one or more of them must be added to the mixture of sulphur and concentrated waste sulphite liquor or the like to make the resultant mixture alkaline if the sulphur is to be readily wettable after drying. These mixtures are not generally equal in wettability to the best mixtures of sulphur, lime-sulphur, and sulphite liquor solids, but they are distinctly wettable and in most instances preferable to combinations known to the prior art.

I will now describe in more detail the preparation and properties of my preferred composition consisting of flotation sulphur, lime-sulphur, and sulphite liquor solids and/or their reaction products, but it is to be understood that other materials can be substituted for the lime-sulphur and sulphite liquor solids, such as those referred to hereinabove, and that other sulphurs of suitable fineness can be substituted for flotation sulphur.

Flotation sulphur, such as "Thylox" sulphur, for example, is recovered in the form of a paste which is preferably washed or otherwise treated to remove undesirable salts as described in the Shoeld application referred to hereinabove, for example, and a purified paste is thereby obtained. Alternatively, the washing may be omitted, or some other suitable treatment may be substituted. The paste may be used as such, or may be partially or completely dried.

Concentrated waste sulphite liquor, or sulphite liquor solids are dissolved in or stirred into water, and sulphur paste or dry sulphur is added and thoroughly mixed in. Enough water is used to make a paste, and lime-sulphur, preferably in the form of a solution of about 32° Baumé, is added at any time during the mixing. The paste is then dried at a suitable temperature, such as 50° C., and powdered, after which it is ready for use as dust or spray.

As an alternative, sulphur may be boiled with enough lime to make the desired amount of lime-sulphur, concentrated waste sulphite liquor is then added and mixed in, and the mixture is then dried and powdered as before. If desired, some other insecticide, fungicide, or other desired constituent, such as lead arsenate, nicotine sulphate, etc., may be added to the mixture before or after drying.

The proportions in which lime-sulphur and sulphite liquor solids are combined with sulphur may be varied within rather wide limits and still result in a readily wettable product which disperses rapidly in water. For example, a preferred composition is made by combining 1 to 3 grams of sulphite liquor solids and 5 to 8 c. c. of 32° Baumé lime-sulphur solution with 100 grams of air-dry flotation sulphur.

The amount of lime-sulphur solution in this combination may be increased to 15 c. c. or more per 100 grams of sulphur without adversely affecting the dispersion properties, and the amount of sulphite liquor solids may be increased to about 4.5% or 5% of the weight of dry sulphur without detrimental effect. If materially larger amounts of sulphite liquor solids are used, the dried cake is more difficult to pulverize, and if excessive amounts of lime-sulphur solution are used, wettability is impaired.

On the other hand, if the amount of lime sulphur solution is decreased below about 4 or 5 c. c. per 100 grams of sulphur, or the amount of sulphite liquor solids is decreased below about 0.5 gram per 100 grams of sulphur, an inferior and less readily wettable sulphur is obtained. In general, therefore, the weight of the sulphite liquor solids should amount to from 0.5% to 5% of the weight of the sulphur with which they are combined, and the weight of lime-sulphur solution should be from 3% to 20% and preferably from 5% to 10% of the weight of the dry sulphur.

Unless otherwise specified, the expression "lime-sulphur solution" refers to standard lime-sulphur solution of about 32° Baumé. It is to be understood, however, that equivalent amounts of lime-sulphur solutions of other strengths may be substituted for the amounts of this solution specified.

That the characteristics of the improved compositions described hereinabove are not merely an aggregation of the properties of mixtures of sulphur with lime-sulphur and the like and mixtures of sulphur with waste sulphite liquor solids and the like will be readily appreciated from the following experimentally determined facts.

A mixture of flotation sulphur and sulphite liquor solids, containing 2 grams of the sulphite liquor solids per 100 grams sulphur, for example, is barely wettable after drying. A dried mixture of sulphur and lime-sulphur is less easily wetted than the sulphur alone. A combination consisting of 1 gram of sulphite liquor solids, 100 grams of sulphur and 5 c. c. of lime-sulphur solution, or the same ingredients in other suitable proportions as described hereinabove, is immediately wetted on contact with water, even when the composition has been oven-dried at temperatures up to 74° C. and higher.

My preferred composition is so readily wettable that small dry particles disperse almost explosively on contact with water. For that reason, the composition has unique properties for use as a dust, as any larger particles discharged with the dust tend to disperse rapidly on contact with moisture drops on the leaves. Likewise, the composition can be readily dispersed in water to form relatively stable suspensions for use as a spray.

It appears that the lime-sulphur and sulphite liquor solids react to form a complex, the composition of which is not at present definitely known, which has remarkable properties as a wetting agent for sulphur. Moreover, in addition to this property it should be noted that the complex is, in itself, an excellent fungicide. As a result, my preferred compositions consisting of sulphur, lime-sulphur and sulphite liquor solids, with or without other ingredients, have superior fungicidal properties, as well as superior physical properties.

It will be obvious to those skilled in the art that certain modifications in addition to those described hereinabove can be made in my process of preparing an improved wettable sulphur composition and in the composition itself without departing from the spirit of my invention, and it is my intention to cover in the claims such changes as are included within the scope thereof.

I claim as my invention:

1. A wettable powder consisting of sulphur and 1 to 3 grams of sulphite liquor solids and 5 to 8 c. c. of lime-sulphur per 100 grams of sulphur.

2. A wettable powder consisting of flotation sulphur and approximately 3 grams of sulphite liquor solids and approximately 5 c. c. of 32° Baumé lime-sulphur solution per 100 grams of sulphur.

3. A wettable powder consisting of sulphur and not less than 3 per cent nor more than 20 per cent by weight of lime-sulphur solution and not less than 0.5 gram nor more than 5 grams of sulphite liquor solids per 100 grams of dry sulphur.

PAUL D. PETERSON.